United States Patent
Turchi

(10) Patent No.: US 7,123,494 B2
(45) Date of Patent: Oct. 17, 2006

(54) POWER FACTOR CORRECTION CIRCUIT AND METHOD OF VARYING SWITCHING FREQUENCY

(75) Inventor: Joel Turchi, Toulouse (FR)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 226 days.

(21) Appl. No.: 10/512,768

(22) PCT Filed: May 6, 2003

(86) PCT No.: PCT/US03/13859

§ 371 (c)(1),
(2), (4) Date: Oct. 28, 2004

(87) PCT Pub. No.: WO2004/107546

PCT Pub. Date: Dec. 9, 2004

(65) Prior Publication Data

US 2006/0087298 A1    Apr. 27, 2006

(51) Int. Cl.
G05F 1/70    (2006.01)
(52) U.S. Cl. .................. 363/89; 323/207; 323/222
(58) Field of Classification Search ............ 323/207, 323/210, 222; 363/89
See application file for complete search history.

(56) References Cited

U.S. PATENT DOCUMENTS

| | | | |
|---|---|---|---|
| 4,683,529 A * | 7/1987 | Bucher, II ................. | 363/44 |
| 4,942,509 A * | 7/1990 | Shires et al. ............... | 363/89 |
| 5,180,964 A * | 1/1993 | Ewing ....................... | 323/222 |
| 5,442,539 A * | 8/1995 | Cuk et al. ................... | 363/89 |
| 5,682,306 A * | 10/1997 | Jansen ........................ | 363/89 |
| 5,742,151 A * | 4/1998 | Hwang ....................... | 323/222 |
| 5,793,624 A * | 8/1998 | Couture et al. ............. | 363/89 |
| 5,886,891 A * | 3/1999 | Jiang et al. ................. | 363/84 |
| 6,469,917 B1 * | 10/2002 | Ben-Yaakov ............... | 363/44 |
| 6,728,121 B1 * | 4/2004 | Ben-Yaakov et al. ...... | 363/89 |

OTHER PUBLICATIONS

"Analysis and Experimental Evaluation of Single-Switch Fast-Response Switching Regulators with Unity Power Factor", K. W. Siu et al., IEEE Transactions on Industry Applications, vol. 33, No. 5, Sep./Oct. 1997, pp. 1260-1266.

* cited by examiner

*Primary Examiner*—Jeffrey Sterrett
(74) *Attorney, Agent, or Firm*—Robert F. Hightower; James J. Stipanuk

(57) ABSTRACT

A power factor correction (PFC) circuit (10) includes a pulse width modulator (31) operating in response to a clock signal (CLK) for switching a coil current (ICOIL) over a charging period (TCHG) to correct a power factor at a node (32). The coil current discharges over a discharging period (TDSCHG) to develop an output voltage (VOUT) at an output (30). An oscillator (35) generates the clock signal to have a clock period (TCLK) longer than the sum of the charging and discharging periods, thereby operating in a discontinuous mode, and has an input (39) for sensing the input signal to modify the clock period.

25 Claims, 6 Drawing Sheets

POWER FACTOR CORRECTION CIRCUIT AND METHOD OF VARYING SWITCHING FREQUENCY

BACKGROUND OF THE INVENTION

The present invention relates in general to integrated circuits and, more particularly, to integrated power factor correction circuits.

Lighting fixtures and other electrical systems have a low power factor because they draw current from the alternating current (AC) mains only near its peak voltage levels, rather than throughout the cycle. Since the voltage peaks occur at the same time for all users in a given distribution network, the aggregate effect is to load the network's generators with a high current at the voltage peaks and little or no current at other times. Such loading generates harmonic distortion of the mains voltage, high neutral currents in three-phase distribution networks and the possible malfunctioning of devices operating from the mains. To avoid the line distortion, regional utility companies are forced to oversize their distribution networks, which requires a large capital investment.

Some governments are trying to relieve this problem by requiring system manufacturers to incorporate power factor correction (PFC) in some electrical systems. For example, Europe's IEC1000-3-2 specification requires PFC in lighting systems as well as the power supplies of certain other electrical devices. The PFC typically is accomplished with PFC circuits that switch the mains current through a coil at a frequency much higher than the mains frequency, and then discharge the coil current through a blocking diode into a capacitor to develop a direct current (DC) supply voltage that is further regulated to power the device or system. The current switching is controlled so that the average value of the coil current is proportional to the AC mains voltage, i.e., in-phase and substantially sinusoidal. This method results in power factors of 0.995 or more, with 1.0 being ideal.

A significant portion of previous PFC circuits operate in a continuous conduction mode, where a new switching cycle is initiated before the previous cycle's coil current discharges to zero. Continuous conduction mode PFC systems require a high performance coil and a blocking diode with a fast recovery time in order to maintain an efficient power transfer. However, the high performance coil and blocking diode have a high cost, which increases the manufacturing cost of the continuous mode PFC systems. Moreover, these systems typically operate at a fixed switching frequency, and therefore produce a high peak energy that requires a costly filter to suppress the resulting electromagnetic interference (EMI).

Other PFC systems operate in a critical or borderline conduction mode where a new switching cycle is initiated just as the coil current reaches zero. Critical conduction mode circuits provide a high power factor but they operate over a wide switching frequency range, and require complex and costly filters to suppress the EMI. Also, under low power conditions, the switching frequency is so high that propagation delays through the PFC circuit degrade the achievable power factor.

Other PFC circuits operate in a discontinuous mode in which the coil current is allowed to decay to zero for a period of time on each switching cycle. These systems can be made to switch at a fixed frequency to reduce the EMI spectrum and allow the use of narrow band EMI filters. However, like the continuous conduction mode PFC circuits, these systems generate high peak levels of radiated energy at a single frequency that can be difficult to suppress even with the narrow band filters.

Hence, there is a need for a PFC circuit and method that switches over a controlled range in order to reduce the EMI filtering cost of an electrical system.

DETAILED DESCRIPTION OF THE DRAWINGS

In the figures, elements having the same reference number have similar functionality.

Figure 1:
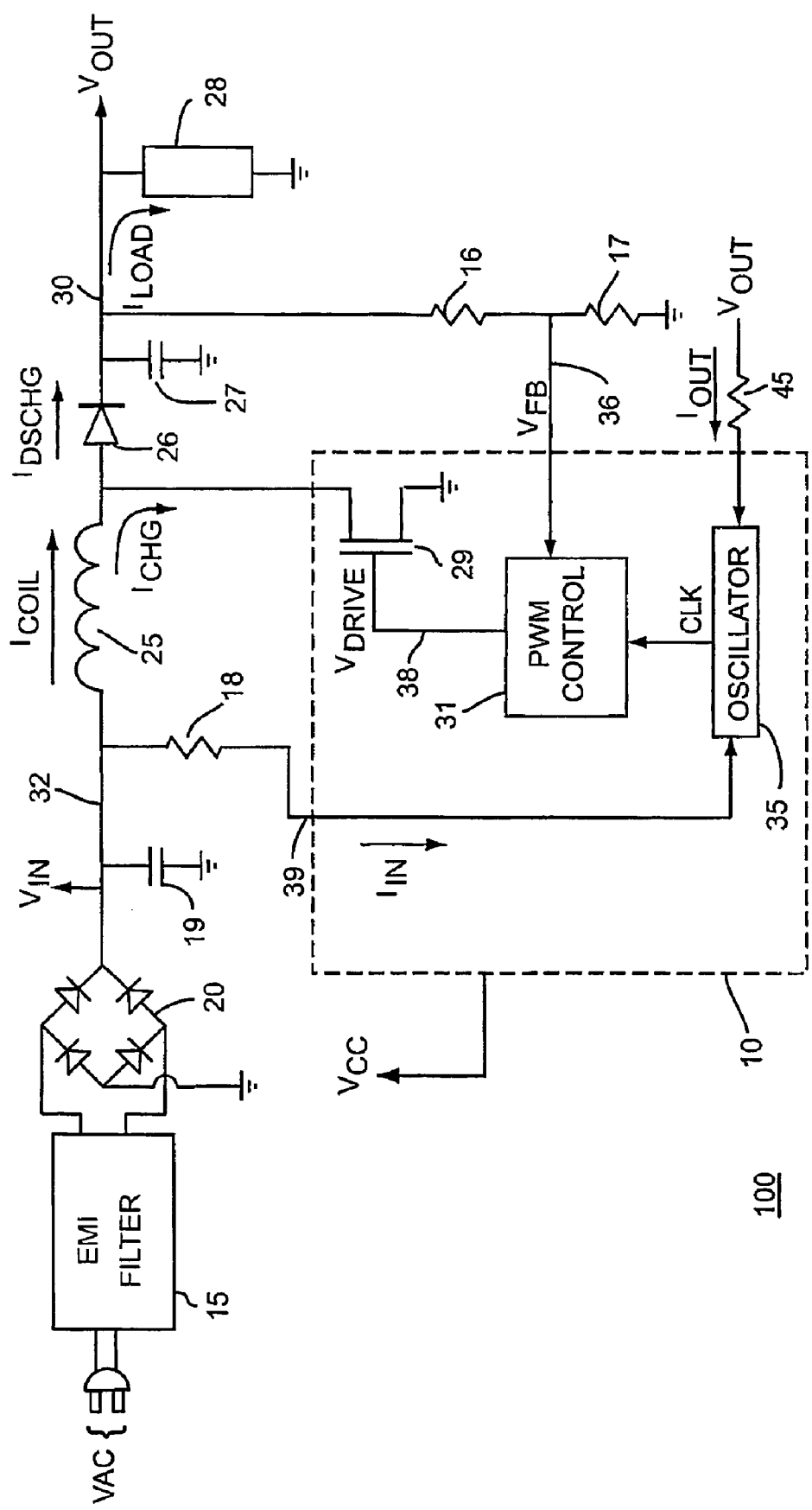
FIG. 1 is a schematic diagram of a power factor correction (PFC) circuit.

FIG. 1 is a schematic diagram of a power factor correction (PFC) circuit 100 for correcting the power factor of an alternating current (AC) mains operating at a sinusoidal AC voltage VAC while supplying a load current $I_{LOAD}$ to a load 28. PFC circuit 100 is controlled by a PFC control circuit 10 operating in a discontinuous mode from a supply voltage $V_{CC}$=12.0 volts, and includes an electromagnetic interference (EMI) filter 15, a capacitor 19, a diode bridge 20, resistors 16–18 and 45, an inductor or coil 25, a blocking diode 26 and an output capacitor 27. PFC circuit 100 produces a direct current (DC) output voltage $V_{OUT}$ at an output node 30.

In general, PFC circuit 100 provides a high power factor for the AC mains by correcting the power factor at an input node 32 operating at an input voltage $V_{IN}$ that is derived by rectifying VAC. In effect, PFC circuit 100 uses feedback to produce a resistive load between node 32 and the negative terminal of bridge 20 which, in the embodiment of FIG. 1, operates at ground potential. As a result, the average value of current flowing through node 32, and therefore the AC mains, is in phase with $V_{IN}$.

In particular, PFC circuit 100 functions as a step up switching regulator in which resistors 16–17 function as a voltage divider to establish a value of $V_{OUT}$ that is boosted to a level higher than the peak level of VAC. In one embodiment, where VAC has a value of about two hundred twenty volts root-mean-square (RMS) and a frequency of about fifty hertz, PFC circuit 100 produces output voltage $V_{OUT}$ with a value of about four hundred volts DC. In some geographical regions, where VAC has a value of about one hundred ten volts RMS and $V_{OUT}$ a frequency of sixty hertz, PFC circuit 100 may generate $V_{OUT}$ at a value of about two hundred thirty volts DC. The size, breakdown voltage, etc., of PFC circuit 100 components may be selected so that systems setting $V_{OUT}$ at about four hundred volts DC can be operated from virtually any mains in the world. Such systems are referred to as universal mains systems. In most regions, VAC has a typical range of about plus and minus twenty percent.

In an alternative embodiment, PFC circuit 100 is configured to combine a power factor correction function with a voltage regulator in a single stage that produces $V_{OUT}$ at a lower voltage than the peak VAC voltage. For example, resistors 16–17 may be selected so that PFC circuit 100 provides $V_{OUT}$ at a level of, say, five volts.

EMI filter 15 is a lowpass filter that passes the low frequency component of VAC while suppressing high frequency switching signals generated by PFC circuit 100. In one embodiment, EMI filter 15 is configured to suppress signal components above about one kilohertz.

Diode bridge 20 is a standard full-wave bridge rectifier that rectifies line voltage VAC and produces a rectified sine wave input voltage $V_{IN}$ at node 32 with a frequency of twice the frequency of VAC or about one hundred hertz and a peak value of about three hundred ten volts. Capacitor 19 is connected across diode bridge 20 to further reduce VAC noise.

Coil 25 has a typical inductance $L_{25}$=100.0 microhenries and a low equivalent series resistance for high efficiency operation.

PFC control circuit 10 includes a transistor 29, a pulse-width modulated (PWM) control circuit 31 and an oscillator 35.

PWM control circuit 10 receives a clock signal CLK from oscillator 35 and initiates a series of pulses referred to as a drive signal $V_{DRIVE}$ that switch transistor 29. Resistors 16 and 17 operate as a voltage divider that divides output voltage $V_{OUT}$ to produce a feedback signal $V_{FB}$ at an input 36. In one embodiment, PWM control circuit 31 compares feedback voltage $V_{FB}$ with an internally generated reference voltage to modulate the widths of the $V_{DRIVE}$ pulses. Hence, as load 28 draws an increased load current $I_{LOAD}$ to discharge capacitor 27 and reduce output voltage $V_{OUT}$, the level of feedback voltage $V_{FB}$ is correspondingly lower. In response, PWM control circuit 31 increases the widths of the $V_{DRIVE}$ pulses, which increases the charge transferred to capacitor 27 from coil 25 to regulate $V_{OUT}$ to its specified level. Accordingly, PWM control circuit 31 is configured so that the widths of the $V_{DRIVE}$ pulses are constant throughout a cycle of $V_{IN}$ if load current $I_{LOAD}$ is constant with respect to the frequency of $V_{IN}$, or about one hundred twenty hertz. In one embodiment, PFC control circuit 10 is suitable for integrating on a semiconductor die to form an integrated circuit.

Transistor 29 is a high current n-channel metal-oxide-semiconductor field effect transistor that switches coil current $I_{COIL}$ through coil 25. In one embodiment, transistor 29 is a power transistor able to switch peak values of $I_{COIL}$ greater than two amperes. Transistor 29 typically has a large gate capacitance greater than five hundred picofarads. Transistor 29 is shown as being integrated on a die with other components of PFC control circuit 10, but alternatively may be formed as an external discrete device.

Coil current $I_{COIL}$ has a component charging current $I_{CHG}$ and a component discharging current $I_{DSCHG}$. The time when transistor 29 is on is referred to as a charging period $T_{CHG}$ during which charging current $I_{CHG}$ flows through coil 25 and transistor 29 to store magnetic energy in coil 25. When load current $I_{LOAD}$ is constant, $T_{CHG}$ is constant throughout a cycle of $V_{IN}$. When transistor 29 switches off, the stored magnetic energy flows as discharge current $I_{DSCHG}$ from coil 25 through blocking diode 26 to capacitor 27 to develop output voltage $V_{OUT}$ on node 30. The time during which discharge current $I_{DSCHG}$ flows is referred to as a discharging period $T_{DSCHG}$, which varies in accordance with the peak value of charging current $T_{CHG}$ and the voltage level of $V_{IN}$.

Oscillator 35 is configured as a voltage controlled oscillator that has an input 39 for sensing an input current $T_{IN}$ derived from input voltage $V_{IN}$. Input 39 operates near ground potential so that $I_{IN}$ is effectively equal to $V_{IN}/R_{18}$, where $R_{18}$ is the resistance of resistor 18. Since $V_{IN}$ has the shape of a rectified sine wave, $I_{IN}$ also has a rectified sinusoidal shape and is therefore representative of $V_{IN}$. An output provides clock signal CLK at a frequency whose variation is dependent on $I_{IN}$. In one embodiment, the magnitude of $I_{IN}$ is selected such that clock signal CLK varies over a range of less than two to one, which is significantly less than the switching frequency range of critical conduction mode PFC circuits, whose frequency spectrum often spans a range of twenty to one or more. In one embodiment, oscillator 35 generates CLK with a nominal frequency of about forty kilohertz and a range from about thirty kilohertz to about fifty kilohertz.

The controlled CLK switching frequency range reduces the peak EMI radiation at any single frequency while generating a limited spectrum of EMI radiated energy to allow EMI filter 15 to be configured in a less complex and costly fashion that reduces the overall cost of PFC circuit 100. The nominal operating frequency of CLK is selected so that when operating at its highest level in response to input current $I_{IN}$, the period of CLK is still low enough to operate PFC circuit 100 in a discontinuous mode, i.e., a mode in which $I_{COIL}$ is zero for a nonzero portion of a switching cycle.

Switching cycles of PFC control circuit 10 are initiated by clock signal CLK which operates with a period much smaller than the period of $V_{IN}$, so a substantially constant voltage $V_{IN}$ appears across coil 25 during any particular switching cycle. As a result, charging current $I_{CHG}$ increases linearly with a slope approximately equal to $V_{IN}/L$ to reach a peak value $I_{PEAK}=T_{CHG}*V_{IN}/L$. Similarly, the slope of discharging current $I_{DSCHG}$ is substantially equal to $(V_{OUT}-V_{IN})/L$, and its duration $T_{DSCHG}=L*I_{PEAK}/(V_{OUT}-V_{IN})$. Hence, the total period when $I_{COIL}$ is nonzero is given by $$T_{COIL} = T_{CHG} + T_{DSCHG} = L \cdot I_{PK} \cdot \frac{V_{OUT}}{V_{IN} \cdot (V_{OUT} - V_{IN})}. \qquad 1)$$

Hence coil current $I_{COIL}$ flows as a triangle wave whose average value $I_{COIL\_CLK}$ over a CLK period $T_{CLK}$ is given by $$I_{COIL\_CLK} = \frac{V_{IN} \cdot T_{CHG}}{2 \cdot L} \cdot \frac{(T_{CHG} + T_{DSCHG})}{T_{CLK}} = \frac{V_{IN}}{2 \cdot L}(T_{CHG} \cdot D_{CYCLE}) \qquad 2)$$

where $D_{CYCLE}=(T_{CHG}+T_{DSCHG})/T_{CLK}$ represents the duty cycle of the nonzero coil current during each CLK period $T_{CLK}$. A high power factor is achieved when the average coil current $I_{COIL\_CLK}$ follows the rectified sinusoidal shape of $V_{IN}$, which occurs if $T_{CHG}*D_{CYCLE}$ is made constant.

Since charging time $T_{CHG}$ is constant when load current $I_{LOAD}$ is constant, in order to maintain the product $T_{CHG}*D_{CYCLE}$ constant and achieve a high power factor, oscillator 35 varies the switching frequency $F_{SW}$ of CLK to keep $D_{CYCLE}$ substantially constant. The average input power $<P_{IN}>$ over a period of input voltage $V_{IN}$ is given by equation 3), $$\langle P_{IN} \rangle = \frac{V_{ACRMS}^2}{2 * L_{25}} * (T_{CHG} + D_{CYCLE}), \qquad 3)$$

where $V_{ACRMS}$ is the root-mean-square value of line voltage VAC. When load current $I_{LOAD}$ is constant, PFC circuit 100 operates with average input power $\langle P_{IN} \rangle$ being constant. Since $V_{ACRMS}$ and L are constant, the constant load condition results in the product $$(T_{CHG} + D_{CYCLE}) = \frac{2 * L_{25} * \langle P_{IN} \rangle}{V_{ACRMS}^2} \qquad 4)$$

being constant as well. From these relationships, it can be shown that the switching frequency $F_{SW}$ needed to achieve a high power factor is given by $$F_{SW} = \frac{2 * L_{25} * \langle P_{IN} \rangle}{V_{ACRMS}^2 * T_{CHG}^2} * \frac{V_{OUT} - V_{IN}}{V_{OUT}}. \qquad 5)$$

As a consequence, when switching frequency $F_{SW}$ is made proportional to the difference between output voltage $V_{OUT}$ and the instantaneous rectified input voltage $V_{IN}$, PFC circuit 100 operates with a PFC approaching one. In fact, under the described steady state conditions, $V_{OUT}$ is regulated, and therefore constant, so equation 5) can be simplified to $$F_{SW} = K_1 * (K_2 - V_{IN}), \qquad 6)$$

where $K_1$ is a constant, $K_2 = V_{OUT}$ and the regulation arrangement adjusts $T_{CHG}$ so that $$K_1 = \frac{2 * L_{25} * \langle P_{IN} \rangle}{V_{ACRMS}^2 * T_{CHG}^2 * V_{OUT}}$$

at a given $\langle P_{IN} \rangle$ and VAC operating point. To achieve a high power factor, CLK frequency $F_{SW}$ effectively is modulated with $V_{IN}$ so that $F_{SW}$ has a lower value near the $V_{IN}$ peaks and a higher value when $V_{IN}$ is near zero volts. To accomplish this, oscillator 35 has inputs operating near ground potential, one for sensing input voltage $V_{IN}$ with a sense current $I_{IN}$ developed through resistor 18 and another for sensing output voltage $V_{OUT}$ with a current $I_{OUT}$ developed through resistor 45. Oscillator 35 subtracts $I_{IN}$ from $I_{OUT}$ to obtain a difference current used to establish the instantaneous value of CLK period $T_{CLK}$, and therefore switching frequency $F_{SW}$.

Figure 2:
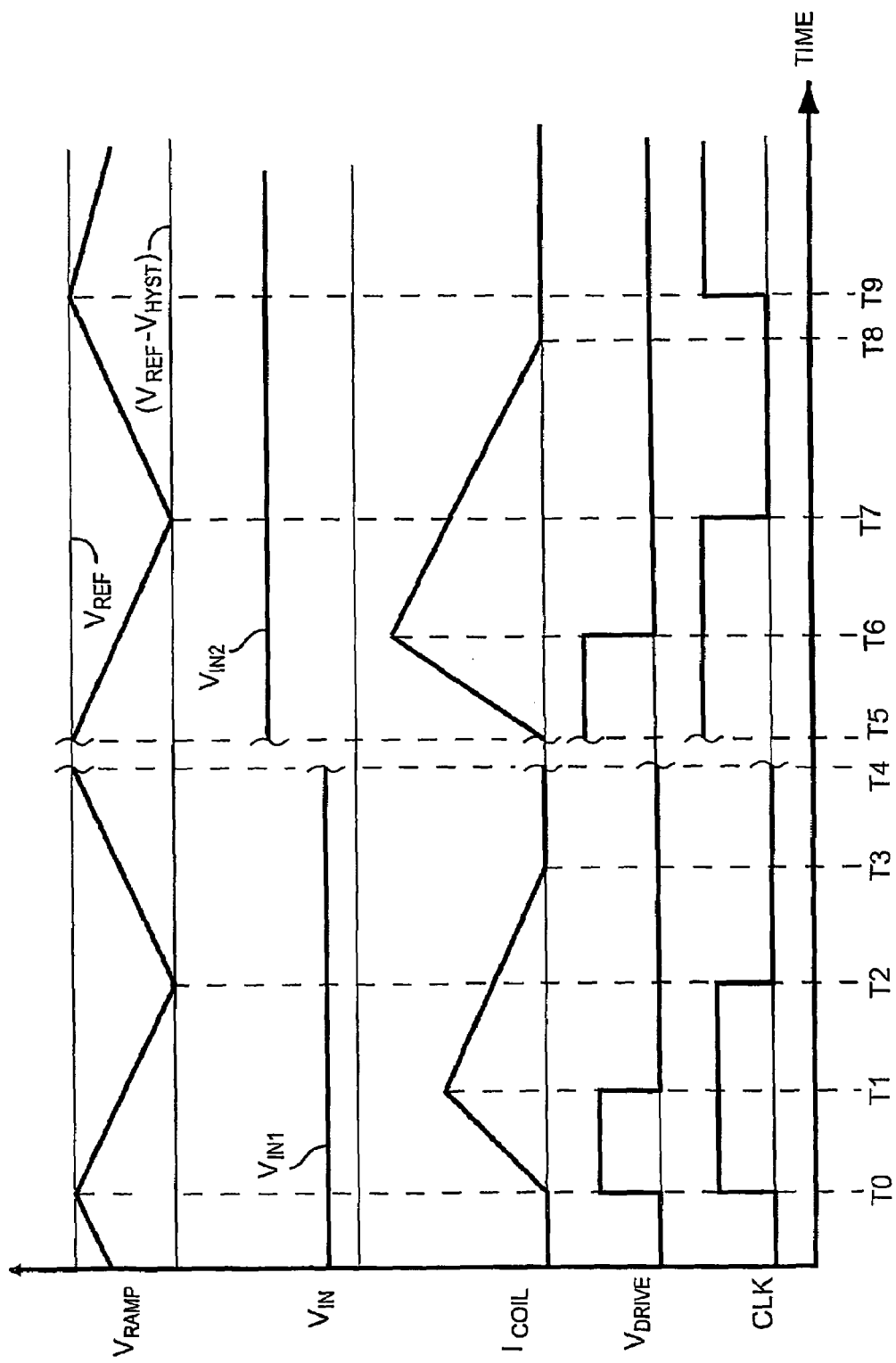
FIG. 2 is a timing diagram showing waveforms of the PFC circuit.

The detailed operation of PFC circuit 100 can be seen by referring to the timing diagram of FIG. 2, showing waveforms of input voltage $V_{IN}$, coil current $I_{COIL}$, drive signal $V_{DRIVE}$ and clock signal CLK over selected switching periods (T4–T0) and (T9–T5), each having a duration in the range of about fifty microseconds, with (T9–T5)>(T4–T0). FIG. 2 shows two CLK cycles or periods $T_{CLK}$, a first period that runs from time T0 to time T4 and a second, longer period that runs from time T5 to time T9. Although input voltage $V_{IN}$ varies as a rectified sinusoid, the CLK period is much shorter than the $V_{IN}$ period. Consequently, in order to better describe the invention, $V_{IN}$ is shown as being constant during each period, but with a value $V_{IN1}$ during the first period that is lower than its value $V_{IN2}$ during the second period.

Assume that initially, just prior to time T0, both CLK and $V_{DRIVE}$ are logic low and transistor 29 and blocking diode 26 are off, so that $I_{COIL}=0.0$ amperes.

At time T0, a first switching cycle begins as clock signal CLK transitions from a logic low level to a logic high level to initiate a pulse of drive signal $V_{DRIVE}$. Transistor 29 turns on to charge coil 25 with charging current $I_{CHG}$ at a linearly increasing rate $V_{IN}/L_{25}$, since the voltage across transistor 29 is nearly zero, and consequently the entire voltage $V_{IN}$ is effectively applied across coil 25. Hence, charging current $I_{CHG}$ increases at a rate proportional to the instantaneous value of $V_{IN}$.

During the interval from time T0 to T1, input signal $V_{IN}$ has a substantially constant voltage value $V_{IN1}$, so that charging current $I_{CHG}$ increases linearly until time T1, when it reaches a peak value of $I_{PK1} = V_{IN1} * T_{CHG/L25}$.

At time T1, $V_{DRIVE}$ makes a transition from a high logic level to a low logic level, turning off transistor 29 to allow the energy stored in coil 25 to be transferred through blocking diode 26 to capacitor 27. The voltage dropped across blocking diode 26 is small in comparison to a voltage $(V_{OUT}-V_{IN})$, so one can consider that $(V_{OUT}-V_{IN1})$ is applied across coil 25, and that $I_{DSCHG}$ decreases linearly at a rate $(V_{OUT}-V_{IN1})/L_{25}$, until it discharges to zero at time $T3=T1+I_{PK1}*L_{25}/(V_{OUT}-V_{IN1})$.

At time T2, clock signal CLK is reset from a high level to a low level, which does not cause a change in the voltage level of drive signal $V_{DRIVE}$.

From time T3 to time T4, $I_{COIL}$ remains at zero for a nonconducting period characteristic of a discontinuous mode of operation of PFC circuit 100.

At time T4, the first switching cycle ends and another switching cycle begins. Several CLK switching cycles may follow.

At time T5, the designated second cycle commences with a low to high CLK and $V_{DRIVE}$ transition, but with input voltage $V_{IN}$ operating at a higher effective voltage value $V_{IN2} > V_{IN1}$. The higher $V_{IN2}$ value causes charging current $I_{CHG}$ to increase linearly and at a faster rate through coil 25 and transistor 29, and to reach a peak value $I_{PK2} = V_{IN2} * T_{CHG}/L_{25}$ at time T6 that is higher than peak value $I_{PK1}$. Note that $T_{CHG}=(T1-T0)=(T6-T5)$ has a constant value when $I_{LOAD}$ is constant.

At time T6, $V_{DRIVE}$ makes another high to low transition to disable transistor 29 and allow magnetic energy stored in coil 25 to be transferred as discharging current $I_{DSCHG}$ through blocking diode 26 for storing on capacitor 27. During the interval from time T6 to time T8, a substantially constant voltage $(V_{OUT}-V_{IN2})$ is applied across coil 25, so $I_{DSCH}$ decreases in a linear fashion with a slope $(V_{OUT}-V_{IN2})/L_{25}$, until it discharges to zero at time $T8=T6+I_{PK2}*L_{25}/(V_{OUT}-V_{IN2})$. Since $V_{IN2}>V_{IN1}$, coil current $I_{COIL}$ reaches a higher peak current $I_{PK2}$, but discharges at a slower rate $(V_{OUT}-V_{IN2})/L_{25}$. A second nonconducting period commences at time T8 when $I_{COIL}$ discharges to zero and lasts until the second switching cycle ends and another switching cycle begins at time T9.

At time T7, clock signal CLK makes a high to low transition that does not affect the level of drive signal $V_{DRIVE}$.

Figure 3:
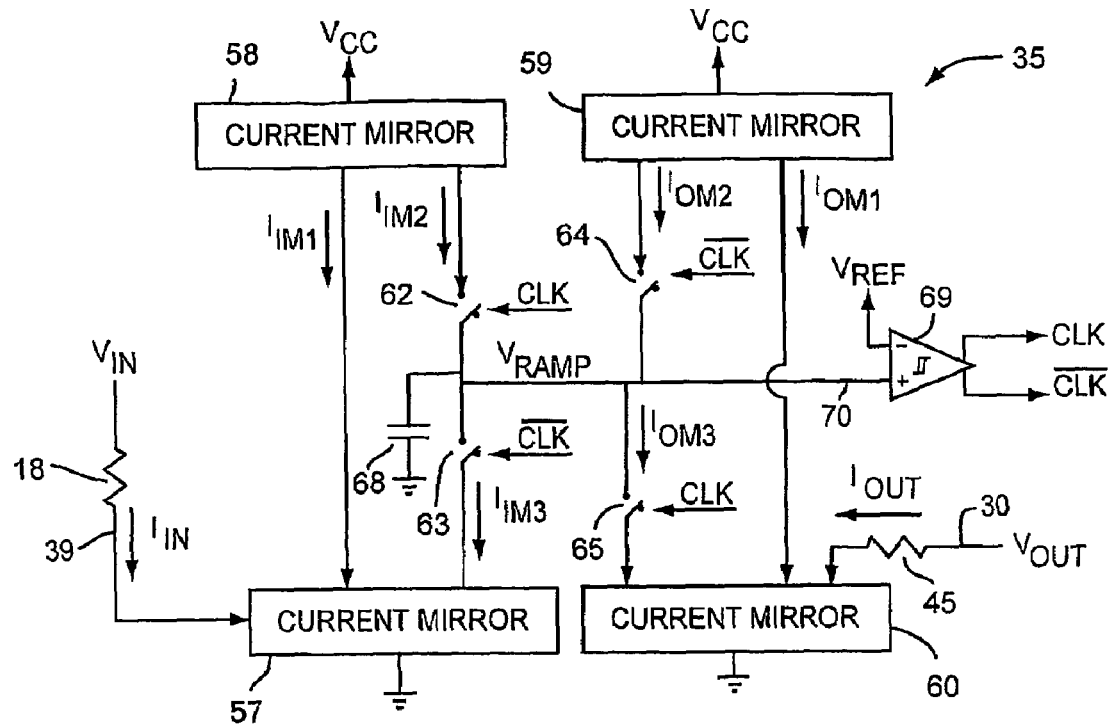
FIG. 3 is a schematic diagram of a portion of the PFC circuit including an oscillator.

FIG. 3 is a circuit diagram showing a portion of PFC circuit 100 including oscillator 35 in further detail along with resistors 18 and 45. Oscillator 35 includes current mirrors 57–60, switches 62–65, a timing capacitor 68 and a comparator 69. Oscillator 35 is configured as a voltage controlled oscillator that produces clock signal CLK as a series of pulses generated at a nominal or center frequency that is modulated in proportion to the difference ($V_{OUT}-V_{IN}$).

Timing capacitor 68 is connected between a timing node 70 and ground potential. Capacitor 68 typically is integrated on the same die as other components of PFC control circuit 10, but alternatively may be formed as an external capacitor. In one embodiment, capacitor 68 has a value of about one hundred picofarads. Capacitor 68 is sequentially charged and discharged by currents $I_{IM2}$, $T_{IM3}$, $I_{OM2}$ and $I_{OM3}$ as described below to form a triangle or ramp voltage $V_{RAMP}$ on node 70.

Switches 62–65 are implemented with transistors that are respectively enabled or turned on either by clock signal CLK or a complementary clock signal $\overline{CLK}$ as shown. Hence, switches 62 and 65 are enabled or closed when CLK is logic high, while switches 63 and 64 are closed when $\overline{CLK}$ is logic high and CLK is logic low.

Comparator 69 is configured as a hysteretic comparator that compares a voltage developed on timing node 70 with a reference voltage $V_{REF}$ to produce clock signal CLK at its output. Comparator 69 has outputs that provide the complementary clock signals CLK and $\overline{CLK}$, or $\overline{CLK}$ may be derived by inverting CLK with a separate inverter (not shown). When comparator 69 is producing CLK with, for example, a logic high level, an internal hysteresis circuit reduces the comparison reference by a hysteresis amount $V_{HYST}$ to a value ($V_{REF}-V_{HYST}$). As a result, CLK remains logic high until $V_{RAMP}$ discharges to a level below ($V_{REF}-V_{HYST}$), at which point CLK transitions to a logic low. The effect of the hysteresis is that $V_{RAMP}$ is produced as a triangle wave that cycles between $V_{REF}$ and ($V_{REF}-V_{HYST}$) as shown in FIG. 2. In one embodiment in which supply voltage $V_{CC}=12.0$ volts, $V_{REF}$ has a value of about three volts and $V_{HYST}$ has a value of about one volt, so the voltage difference ($V_{REF}-V_{HYST}$) has a level of about two volts.

Current mirrors 57–58 include scaled transistors that produce mirrored currents $I_{IM1}$, $I_{IM2}$, $I_{IM3}$ and $I_{IM4}$ that are proportional to, or multiples of, input sense current $I_{IN}$. Similarly, current mirrors 59–60 include scaled transistors that produce mirrored currents $I_{OM1}$, $I_{OM2}$ and $I_{OM3}$ that are proportional to, or multiples of, output sense current $I_{OUT}$.

Oscillator 35 operates as follows. Assume that initially, clock signal CLK is logic low, so switches 63 and 64 are closed, switches 62 and 65 are open and $V_{RAMP}$ is increasing with a value less than $V_{REF}$, as shown in FIG. 2. At time T0, CLK transitions to a logic high, which closes switches 62 and 65 and opens switches 63–64 to discharge capacitor 68 with current $I_{OM3}$ while concurrently charging with current $I_{IM2}$. Current mirrors 57–60 are ratioed so that $I_{OM3}$ is higher than $I_{IM2}$, so the algebraic sum of currents $I_{OM3}$ and $I_{IM2}$ results in a net difference current ($I_{OM3}-I_{IM2}$) that discharges capacitor 68 to decrease the level of $V_{RAMP}$.

At time T2, $V_{RAMP}$ reaches the level of ($V_{REF}-V_{HYST}$), at which time CLK transitions to a logic low, which closes switches 63–64 and opens switches 62 and 65. Capacitor 68 is then charged by current $I_{OM2}$ while being discharged by current $I_{IM3}$. Currents $I_{IM3}$ and $I_{OM2}$ are scaled so that $I_{IM3}<I_{OM2}$, which results in charging capacitor 68 with an effective difference current ($I_{OM2}-I_{IM3}$) When capacitor 68 is charged to a point where $V_{RAMP}>V_{REF}$, CLK makes a low to high transition to begin another cycle.

The scaling or mirroring ratios of current mirrors 57–60 are further selected so that capacitor 68 is charged and discharged with currents ($I_{OM2}-I_{IM3}$)=$K_3*(V_{OUT}-V_{IN})$ and ($I_{OM3}-I_{IM2}$)=$K_4*(V_{OUT}-V_{IN})$, respectively, where $K_3$ and $K_4$ are constants. It can be shown that switching frequency $F_{SW}$ has the form shown in equation 6) above, which results in a power factor approaching one.

Figure 4:
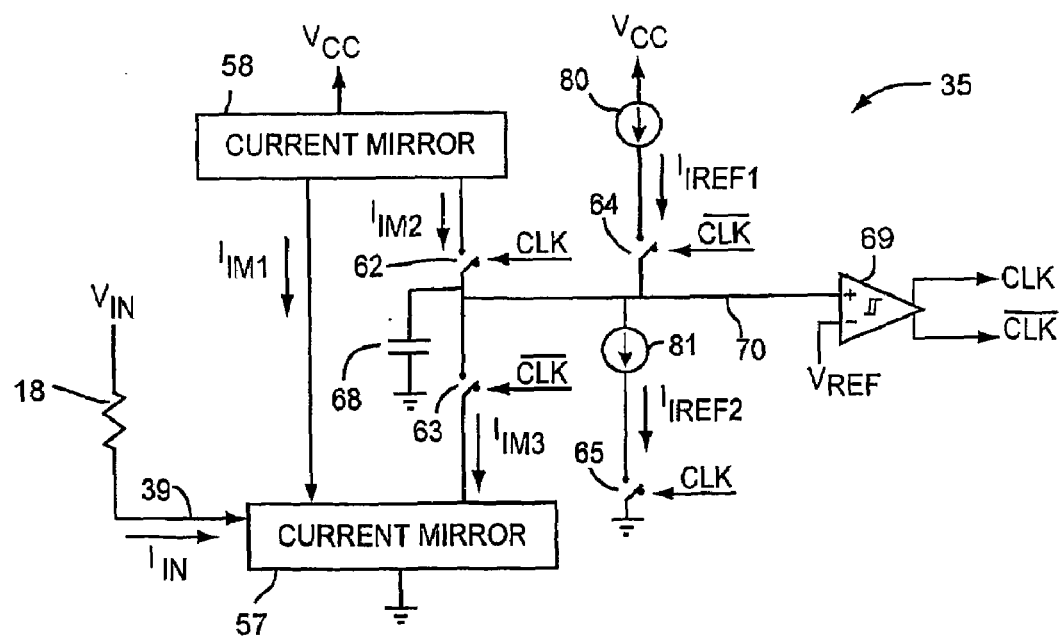
FIG. 4 is a schematic diagram of the oscillator in a first alternate embodiment.

FIG. 4 is a circuit diagram showing a portion of PFC circuit 100 including further detail of oscillator 35 in an alternate embodiment along with resistor 18. Oscillator 35 includes current sources 80–81, current mirrors 57–58, switches 62–65, a timing capacitor 68 and a comparator 69.

Current source 80 supplies a charging reference current $I_{REF1}$ from supply voltage $V_{CC}$ to node 70 when $\overline{CLK}$ is high and switch 64 is closed, and current source 81 supplies a scaled or mirrored discharging reference current $I_{REF2}$ to node 70 when CLK is high and switch 65 is closed. The scaling or mirroring ratios of current mirrors 57–58 and current sources 80–81 are selected so that capacitor 68 is charged with a difference current ($I_{IREF1}-I_{IM3}$)=$K_5*(V_{REF}-V_{IN})$ when $\overline{CLK}$ is high, where $K_5$ is a constant, and discharged with a difference current ($I_{REF2}-I_{IM2}$)=$K_7*(V_{REF}-V_{IN})$, where $K_7$ is a constant. It should be evident that these equations establish switching frequency $F_{SW}$ in accordance with equation 6) above, thereby achieving a power factor approaching one, assuming that $V_{REF}$ is representative of a desired value of $V_{OUT}$.

Figure 5:
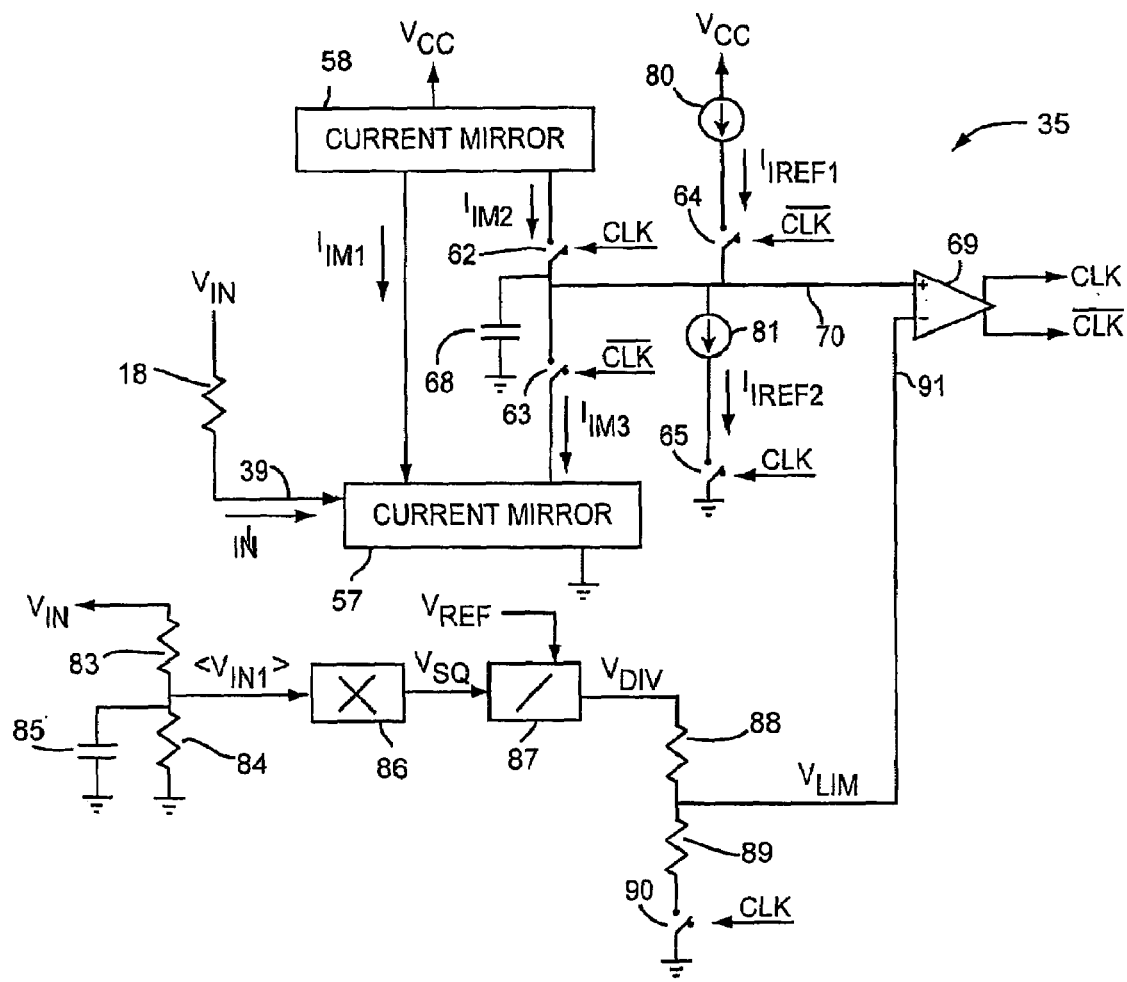
FIG. 5 is a schematic diagram of the oscillator in a second alternate embodiment.

FIG. 5 is a schematic diagram showing further detail of oscillator 35 in yet another alternate embodiment. This embodiment has a similar operation and structure as the embodiment described in FIG. 4, except that comparator 69 is non-hysteretic and the $V_{RAMP}$ switching limits are established with a limit voltage $V_{LIM}$ that is generated with circuitry that includes resistors 83–84 and 88–89, a capacitor 85, a squaring circuit or multiplier 86, a division circuit 87 and a switch 90.

As shown above, for a constant $I_{LOAD}$ and $T_{CHG}$, high power factors are achievable if CLK frequency $F_{SW}$ is proportional to ($V_{OUT}-V_{IN}$). However, as shown in equation 6), $F_{SW}$ has a large variation if $V_{IN}$ has a high amplitude, particularly at the voltage peaks where the peak $I_{COIL}$ currents flow. This embodiment provides a circuit that reduces the overall frequency variation or jitter as follows.

Resistors 83–84 operate as a voltage divider that divides input voltage $V_{IN}$, and capacitor 85 cooperates with resistors 83–84 to produce a low pass filter that produces an average voltage <$V_{IN1}$> whose ripple is substantially zero, or at least is small compared to the rectified sine wave shape of $V_{IN}$. In one embodiment, resistors 83–84 and capacitor 85 are selected to set the low pass corner frequency to about ten hertz, so that $V_R$ is substantially a DC voltage. As a result of this low pass filtering, <$V_{IN1}$> is indicative of the average value of $V_{IN}$.

Multiplier 86 is a standard analog multiplier circuit that squares average voltage $V_{IN1}$ to produce a squared voltage $V_{SQ}=K_8*<V_{IN1}>^2$, where $K_8$ is a constant.

Division circuit 87 divides a reference voltage $V_{REF}$ by $V_{SQ}$ to produce a voltage $V_{LIM}=V_{DIV}=V_{REF}/(K_8*<V_{IN1}>^2)$, which is coupled through resistor 88 to set an upper limit of $V_{RAMP}$ at an input of comparator 69 when clock signal CLK is low. When CLK is high, switch 90 closes and $V_{DIV}$ is voltage divided by resistors 88–89 to establish a lower limit of $V_{RAMP}$ at a level $V_{LIM}=V_{REF}/(K_8*<V_{IN1}>^2)*R_{89}/(R_{88}+R_{89})$, where $R_{88}$ and $R_{89}$ are the resistances of resistors 88 and 89, respectively.

Hence, switching frequency $F_{SW}=K_9*<V_{IN}>^{2*}(V_{REF}-V_{IN})$, where $K_9$ is a constant. This option allows oscillator 35 to limit the switching frequency variations to facilitate EMI filtering.

Figure 6:
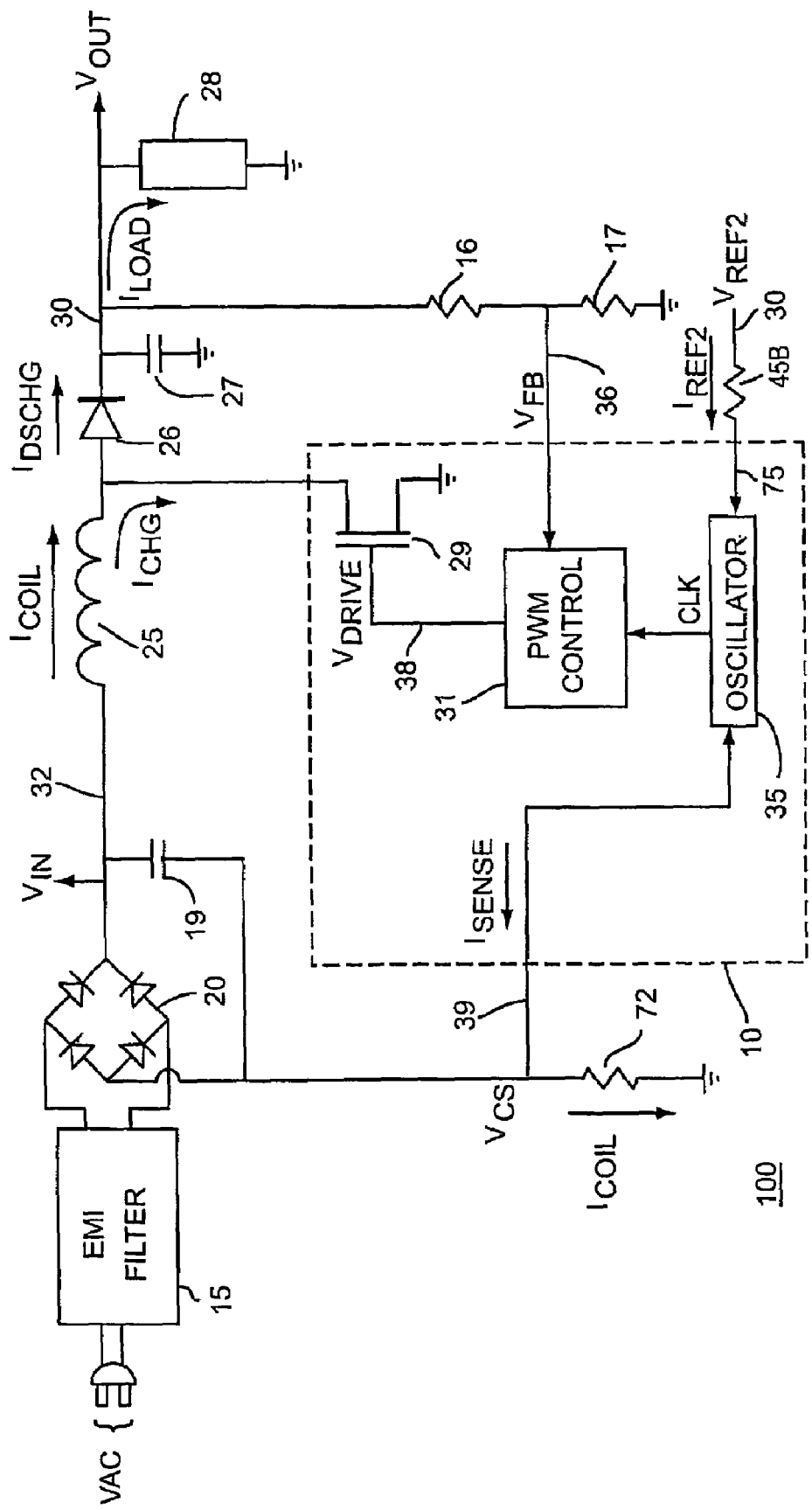
FIG. 6 is a circuit diagram of the PFC circuit in an alternate embodiment.

FIG. 6 is a schematic diagram of PFC circuit 100 in an alternate embodiment. This embodiment eliminates the need for resistor 18 and its dissipated power $P_{R18}=I_{IN}^2*R_{18}$, where $R_{18}$ is the resistance of resistor 18. Hence, this embodiment is suitable for applications requiring low standby power and a less than ideal power factor.

The embodiment of FIG. 6 modulates switching frequency $F_{SW}$ with the instantaneous value of coil current $I_{COIL}$, rather than input voltage $V_{IN}$. On average, $I_{COIL}$ has a sinusoidal waveform in phase with $V_{IN}$ due to the power factor correcting operation of PFC circuit 100. $I_{COIL}$ is sensed in its return path through resistor 72 to diode bridge 20, which develops a current sense voltage $V_{CS}$ across resistor 72 on a node 39 to modulate $F_{SW}$. In one embodiment, resistor 72 has a resistance of about 0.1 ohms, so $V_{CS}$ has a value of about −0.1 volts when $I_{COIL}$ has a magnitude of one ampere. Alternatively, $I_{COIL}$ can be measured using other techniques, like a current transformer rather than current sensing resistor 72. The use of coil current $I_{COIL}$, rather than input voltage $V_{IN}$, to vary switching frequency $F_{SW}$ is a approach suitable for either continuous mode or discontinuous mode PFC circuits or for an embodiment in which power factor correction is combined in a single stage with a downstream voltage regulator or converter.

The power factor of this embodiment is believed to be lower than that of the previously described embodiments because the instantaneous value of $I_{COIL}$ only approximates the rectified sinusoidal shape of $V_{IN}$. Nevertheless, this version has a low power consumption and can be fabricated at a low cost, which make it suitable for many applications not requiring the highest achievable power factor. In one embodiment, the power factor can be improved by connecting a capacitance across resistor 72. The capacitance is selected to filter out high frequency components, e.g., those above the frequency of $V_{IN}$, to produce a waveform at node 39 that more ideally approximates a rectified sine wave.

Figure 7:
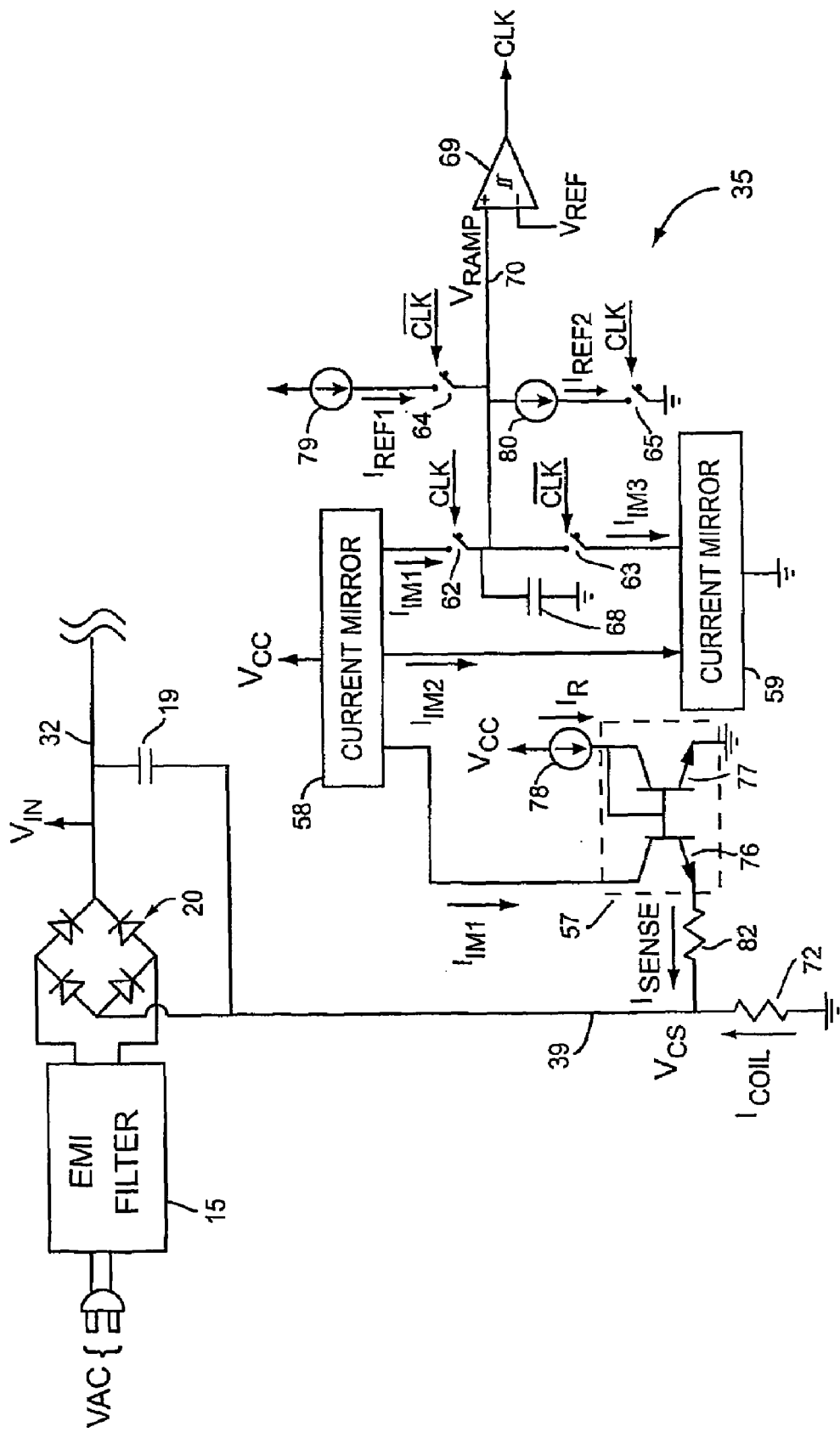
FIG. 7 is a circuit diagram of the PFC circuit in another alternate embodiment.

FIG. 7 shows a portion of PFC circuit 100 in the embodiment described in FIG. 6, including a resistor 82, a current source 78 and further detail of current mirror 57 of oscillator 35.

Transistors 76–77 are shown as being formed as a matched or scaled pair of NPN bipolar transistors, whose emitter areas are scaled in a predetermined ratio. Current source 78 supplies a current $I_R$ through transistor 77 to establish a base-emitter voltage that biases the base electrode of transistor 76 to a fixed potential.

Resistor 82 typically is formed as an external resistor to avoid deleterious effects resulting from the negative potential of current sense voltage $V_{CS}$ when $I_{COIL}$ is flowing. If transistor 76 and 77 have the same emitter area ratio, their respective emitters operate at substantially the same potential, so current $I_{M1}$ is proportional to $I_{COIL}$ since $V_{CS}=-R_{72}*I_{COIL}$, $I_{SENSE}$ substantially equals $I_{M1}$ (neglecting 57 base current) and $V_{CS}+(R_{82}*I_{SENSE})$ is zero, where the resistance of resistor 82 is $R_{82}$, and selected to provide a desired sampling current $I_{SENSE}$ through transistor 76. Then $I_{M1}=R_{72}*I_{COIL}/R_{82}$. $I_{SENSE}$ is mirrored by current mirrors 58–59 to provide differential charging and discharging currents $(I_{REF1}-I_{M3})$ and $(I_{REF2}-I_{M1})$, respectively, to timing node 70 as described above.

In summary, the present invention provides a PFC circuit that operates in a discontinuous mode with a fixed switching pulsewidth. The discontinuous mode of operation allows the PFC circuit to be fabricated with low cost blocking diode, which reduces the system cost. A pulse width modulator is synchronized to transition edges of a clock signal to generate pulses that establish a charging period for a coil current. The coil current is then discharged over a discharging period to develop a PFC output voltage from an input signal. An oscillator generates the clock signal so that its clock period is longer than the sum of the charging and discharging periods, thereby ensuring discontinuous mode operation. The oscillator has an input for sensing an input signal of the PFC circuit to modify the clock period in a controlled fashion to maintain the product of the charging period and the duty cycle of the coil current constant. The PFC circuit thereby switches the coil current over a predefined frequency range to facilitate the reduction of electromagnetic interference with a low cost EMI filter.

What is claimed is:

1. A power factor correction (PFC) circuit, comprising:
   a pulse width modulator operating in response to a clock signal for switching a coil current over a charging period to correct a power factor at a first node, wherein the coil current discharges over a discharging period to develop an output voltage; and
   an oscillator having an output for generating the clock signal to have a clock period longer than the sum of the charging and discharging periods, and a first input for sensing the input signal of the PFC circuit to modify the clock period.

2. The PFC circuit of claim 1, wherein a load current of the output voltage is constant, the charging and discharging periods are summed over the clock period to define a duty cycle of the coil current, and the input signal modifies the clock period to maintain the product of the duty cycle and the charging period constant.

3. The PFC circuit of claim 1, wherein the input signal of the PFC circuit operates substantially as a rectified sine wave voltage.

4. The PFC circuit of claim 1, wherein the oscillator is formed as a voltage controlled oscillator to include:
   a ramp generator operating in response to the clock signal and having a second node for supplying a charging current to a capacitance to generate a ramp voltage that increases from a first reference level to a second reference level over the charging period;
   a comparator for comparing the ramp voltage with first and second reference voltages and having an output coupled to the output of the oscillator; and
   a current mirror having a first input for receiving an input current representative of the input signal to provide a first mirrored current to the second node for subtracting from the charging current to modify the clock period.

5. The PFC circuit of claim 4, wherein the current mirror provides a second mirrored current for charging the second node and the ramp generator includes:
   a first current source coupled to the second node for supplying the charging current; and
   a second current source coupled for discharging the second node with a discharging current from which the second mirrored current is subtracted.

6. The PFC circuit of claim 1, wherein the pulse width modulator has a feedback input coupled for sensing the output voltage to adjust the charging period of the pulses in response to a load current of the PFC circuit.

7. The PFC circuit of claim 1, wherein the output voltage has a higher value than a peak voltage of the input signal.

8. The PFC circuit of claim 1, wherein the input signal is representative of the coil current.

9. The PFC circuit of claim 8, further comprising a sense resistor coupled to the first input of the oscillator for routing the coil current to develop a sense voltage.

10. A power factor correction (PFC) circuit operating in a discontinuous mode, comprising:
- a pulse width modulator having an input for receiving pulses having pulsewidths representative of a load current of the PFC circuit for charging coil currents that are discharged to develop an output voltage; and
- an oscillator having an output for generating the pulses at a frequency selected for discharging the coil current to zero, and an input for sensing an input signal of the PFC circuit to modify the frequency.

11. The PFC circuit of claim 10, wherein the output voltage is developed at a node and the pulses have trailing edges for discharging the coil currents to a capacitance of the node to develop the output voltage.

12. The PFC circuit of claim 11, wherein the pulsewidths are substantially equal when the load current is constant.

13. A method of correcting a power factor of an input signal, comprising:
- generating pulses with a clock signal to establish a charging period for a coil current, wherein a clock period of the clock signal is longer than a sum of the charging period and a discharging period of the coil current;
- discharging the coil current to zero over the discharging period to develop an output voltage; and
- sensing the input signal of the PFC circuit to modify the clock period.

14. The method of claim 13, wherein a load current of the output voltage is constant, the charging and discharging periods are summed over the clock period to define a duty cycle of the coil current, and the input signal modifies the clock period to maintain the product of the duty cycle and the charging period constant.

15. The method of claim 14, further comprising:
- charging a capacitance with a charging current to generate a ramp voltage;
- comparing the ramp voltage with a first reference voltage to produce the clock signal; and
- mirroring an input current representative of the input signal to provide a first mirrored current to the capacitance to modify the clock period.

16. The method of claim 15, wherein mirroring includes subtracting the first mirrored current from the charging current to modify the clock period.

17. The method of claim 16, wherein mirroring includes enabling the first mirrored current in response to the first transition of the clock signal.

18. The method of claim 15, wherein charging includes increasing the ramp voltage with the charging current, and comparing includes producing a first transition of the clock signal.

19. The method of claim 18, further comprising mirroring the input current to provide a second mirrored current for subtracting from the discharging current to modify the clock period.

20. The method of claim 15, further comprising:
- discharging the capacitance with a discharging current to decrease the ramp voltage; and
- comparing the ramp voltage with a second reference voltage to produce a second transition of the clock signal.

21. A power factor correction (PFC) circuit, comprising:
- a pulse width modulator operating in response to a clock signal for synchronizing pulses that establish a coil current from an input voltage, where the coil current is discharged to develop an output voltage; and
- an oscillator having an output for generating the clock signal at a frequency, and an input for sensing the coil current to modify the frequency.

22. The PFC circuit of claim 21, wherein the clock signal goes through first transitions from a first logic level to a second logic level and second transitions from the second logic level to the first logic level, and the pulse width modulator generates the pulses in response to the first transitions.

23. The PFC circuit of claim 21, wherein the pulses have a constant pulsewidth.

24. The PFC circuit of claim 21, further comprising a current path coupled to the input of the oscillator for routing the coil current to develop a sense signal.

25. The PFC circuit of claim 24, wherein the current path includes a resistor across which the sense signal is developed.

* * * * *